United States Patent
Twohig et al.

(10) Patent No.: US 11,782,600 B2
(45) Date of Patent: Oct. 10, 2023

(54) STORAGE DEVICE HEALTH STATUS CONTROLLER

(71) Applicant: EMC IP Holding Company LLC, Hopkinton, MA (US)

(72) Inventors: Aaron Twohig, Rathpeacon (IE); Paul McSweeney, Silversprings (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/079,680

(22) Filed: Oct. 26, 2020

(65) Prior Publication Data

US 2022/0129156 A1    Apr. 28, 2022

(51) Int. Cl.
  *G06F 3/06*    (2006.01)
  *G06N 20/00*    (2019.01)
  *G06Q 10/10*    (2023.01)
  *G06Q 10/0639*    (2023.01)

(52) U.S. Cl.
  CPC .......... *G06F 3/0604* (2013.01); *G06F 3/0653* (2013.01); *G06F 3/0673* (2013.01); *G06N 20/00* (2019.01); *G06Q 10/0639* (2013.01); *G06Q 10/10* (2013.01)

(58) Field of Classification Search
  None
  See application file for complete search history.

(56) References Cited

U.S. PATENT DOCUMENTS

| | | | |
|---|---|---|---|
| 7,925,606 B1* | 4/2011 | Katzer | G16H 40/67 |
| | | | 705/2 |
| 8,447,820 B1* | 5/2013 | Gay | G06Q 10/10 |
| | | | 709/212 |
| 9,454,412 B2* | 9/2016 | Rosier | G06F 11/321 |
| 9,612,897 B1* | 4/2017 | Bernico | G06N 20/00 |
| 2014/0188779 A1* | 7/2014 | Sakuraba | G06N 7/005 |
| | | | 706/52 |
| 2014/0351208 A1* | 11/2014 | Jenkins | G06F 3/061 |
| | | | 707/610 |
| 2016/0371132 A1* | 12/2016 | Prabhakara | G06F 11/0787 |
| 2018/0275902 A1* | 9/2018 | Monday | G06F 11/3055 |
| 2020/0192779 A1* | 6/2020 | Minja | G06F 11/3476 |

* cited by examiner

*Primary Examiner* — Arpan P. Savia
*Assistant Examiner* — Edmund H Kwong
(74) *Attorney, Agent, or Firm* — Krishnendu Gupta; Nikhil Patel (57) ABSTRACT

One or more aspects of the present disclosure relate to a storage health status. In embodiments, one or more events corresponding to a storage array can be received. Each event can include an alert. A type of each event can also be identified. For each event having a qualifying type, at least one prior event made obsolete by each received event can be cleared.

18 Claims, 5 Drawing Sheets

STORAGE DEVICE HEALTH STATUS CONTROLLER

BACKGROUND

A data storage system including storage arrays can use multiple drives in a collection to store a huge amount of data. The stored data can be critical to the operations and success of an organization. Accordingly, organizations generally monitor a health status of their storage arrays to ensure their valuable data is stored by a reliable array.

SUMMARY

One or more aspects of the present disclosure relate to a storage health status. In embodiments, one or more events corresponding to a storage array can be received. Each event can include an alert. A type of each event can also be identified. For each event having a qualifying type, at least one prior alert made obsolete by each received event can be cleared.

In embodiments, information from one or more daemons of the storage array can be received. Further, each daemon can monitor a component of the storage array and transmit one or more logs of events corresponding to the component.

In embodiments, characteristic metadata corresponding to each event. Can be generated.

In embodiments, a probability that the type of each event impacts an alert extracted from a previously received event can be determined.

In embodiments, a component related to each event can be identified. Additionally, event content from each event can be extracted.

In embodiments, a correlation between the component and an item of interest can be determined. The item of interest can correspond to a storage device component capable of impacting a health metric of the storage device.

In embodiments, a relationship between the event content and a status change of the item of interest can be determined.

In embodiments, those events having a component related to an item of interest and content related to a status change of the item of interest can be passed to an auto-clearing queue.

In embodiments, a key for each item of interest can be generated and stored in the auto-clearing queue.

In embodiments, current alerts associated with each key can be obtained. For each key, a determination regarding whether a previous alert relates to an obtained current alert can be made.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A data storage system including storage arrays can use multiple drives in a collection to store a huge amount of data. The stored data can be critical to the operations and success of an organization. Accordingly, organizations generally monitor a health status of their storage arrays to ensure their valuable data is stored by a reliable array.

Current health monitoring techniques issue notifications that can issue one or more alerts to a host device. The alerts can include information related to a storage array event. The storage array event can include a fault and a status change, amongst other known storage array events. The techniques store the issued notifications in a log of events.

Further, the current health monitoring techniques can generate a health score of a storage array. Typically, health monitoring techniques generate health scores based on an analysis of issued alerts. However, these techniques generally require a host operator to access the log and clear outdated events. As such, the generated health score can be inaccurate if the operator fails to update the log.

The present disclosure relates to intelligent clearing techniques that dynamically identify and clear outdated alerts, in real-time. As such, the disclosed embodiment can provide accurate and actionable storage array health scores. In embodiments, one or more events corresponding to a storage array can be received. Each event can include an alert. A type of each event can also be identified. For each event having a qualifying type, at least one prior event made obsolete by each received event can be cleared.

Figure 1:
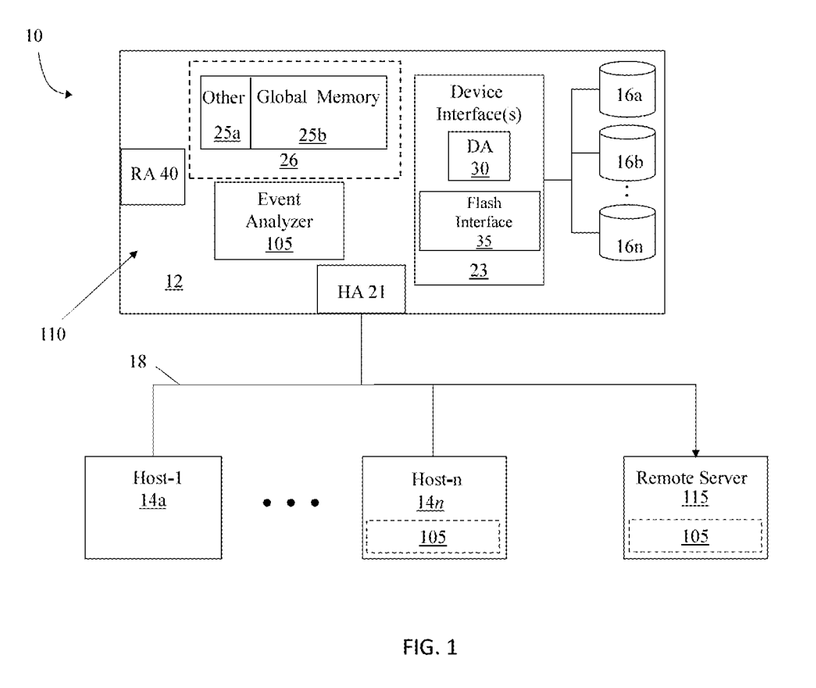
FIG. 1 is a block diagram of a storage system in accordance with example embodiments disclosed herein.

Referring to FIG. 1, an example system 10 includes data storage array 12. The array 12 can communicatively connect to host systems 14*a*-*n* through communication medium 18. In embodiments, the hosts 14*a*-*n* can access the data storage array 12, for example, to perform input/output (I/O) operations or data requests.

The communication medium 18 can be any one or more of a variety of networks or other type of communication connections as known to those skilled in the art. In embodiments, the communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the hosts 14*a*-*n* can access and communicate with the data storage array 12. The hosts 14*a*-*n* can also communicate with other components included in the system 10 via the communication medium 18.

The hosts 14*a*-*n* and data storage array 12 can connect to the communication medium 18 by any one of a variety of connections. The communication medium 18, based on its type, can supply, and support the connection. The hosts 14*a*-*n*, array 12, and monitor 105 can include processors, which can be any one of a variety of proprietary or commercially available single or multi-processor system. An example processor can be an Intel-based processor, or other type of commercially available processor able to support traffic based on each embodiment and application.

Each of the hosts 14*a*-*n* and data storage array 12 can all be found at the same physical site or can be in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-n and data storage array 12 can be connected to the communication medium can pass through other communication devices, such switching equipment that can exist such as a phone line, a repeater, a multiplexer or even a satellite.

Each of the hosts 14a-n can perform distinct types of data operations. For example, any of the hosts 14a-n can issue a data request to the data storage array 12. In embodiments, the hosts 14a-n can be executing an application that an perform either a read or write operation resulting in one or more data requests to the data storage array 12.

Although array 12 is illustrated as a single data storage array, array 12 can also represent, for example, multiple data storage arrays alone, or in combination with, other data storage systems, systems, appliances, and/or components having suitable connectivity, such as in a SAN. Embodiments can also include data storage arrays or other components from one or more vendors. In embodiments described herein, reference can be made to a single data storage array by a vendor, such as by DELL Technologies of Hopkinton, Mass. However, as is appreciated by those skilled in the art, the disclosed embodiments are applicable for use with other data storage arrays by other vendors and with other components than as described herein for purposes of example.

The data storage array 12 can include a variety of software and hardware elements ("components") 110. In embodiments, the data storage array 12 can include a plurality of data storage disks 16a-n. The data storage disks 16a-n can include one or more data storage types such as, for example, one or more disk drives and/or one or more solid state drives (SSDs). An SSD is a data storage device that uses solid-state memory to store persistent data. An SSD using SRAM or DRAM, rather than flash memory, can be a RAM drive. SSD can refer to solid state electronics devices as distinguished from electromechanical devices, such as hard drives, having moving parts. Flash devices or flash memory based SSDs are one type of SSD that does not have moving parts. In embodiments, one or more of the disks 16a-n can be flash drives or devices. In other embodiments, the disks 16a-n can work with any type of SSD such as a flash device or flash memory device.

The storage array 12 can also include distinct types of adapters or directors, such as a HA 21 (host adapter), RA 40 (remote adapter), and/or device interface 23. Each of the adapters HA 21, RA 40 can include hardware such as a processor including local memory. The local memory can store instructions used by the processor to execute storage array operations. The HA 21 can manage communications and data operations between one or more host systems 14a-n and the global memory (GM) 25b. In an embodiment, the HA 21 can be a Fibre Channel Adapter (FA) or another adapter which enables host 14a-n to communicate with the array 12. A front-end of the data storage array 12 can include the HA 21. The RA 40 can enable communications between data storage arrays (e.g., between the storage array 12 and the external system(s)). The storage array 12 can also include one or more device interfaces 23 that enable data transfers to/from the data storage disks 16a-n. The device interfaces 23 can include device interface modules, for example, one or more disk adapters (DAs) 30 (e.g., disk controllers), flash drive interface 35, and the like. The DA 30 can be in a backend part of the data storage array 12. The backend part of the array 12 can enable data transfers to/from the physical data storage disks 16a-n.

One or more internal logical communication paths can exist between the device interfaces 23, the RAs 40, the HAs 21, and the memory 26. An embodiment, for example, can use one or more internal busses and/or communication modules. The memory 26 can include global memory 25b that enables data transfers and other communications between the device interfaces 23, HA 21 and/or RA 40. In an embodiment, the device interfaces 23 can perform data operations using a cache (not shown) of the global memory 25b. The memory 26 can include memory portion 25a that configured for customized use based on specific requirements of a business.

The data storage system 10 as described in this embodiment, or a device thereof, such as a disk or aspects of a flash device, should not be construed as a limitation. Other types of commercially available data storage systems, as well as processors and hardware controlling access to these devices, can also be included in an embodiment.

Host systems 14a-n supply data and access control information through channels (e.g., medium 18) to the storage array 12. The storage array 12 can also supply data to the host systems 14a-n also through the channels. The host systems 14a-n do not address the drives or disks 16a-n of the storage systems directly, but access data from a plurality of logical devices or logical volumes (LVs) set up by the array 12. The LVs do not need to correspond to the actual physical devices or drives 16a-n. For example, one or more LVs can exist on a single physical drive or multiple drives. Hosts 14a-n can access data from the array 12 stored by disks 16a-n via HA 21. The RA 40 can enable communications between two or more data storage arrays. The DA 30 can be one type of device interface that enables data transfers to/from the disk drive(s) 16a-n and their corresponding LV(s). A flash device interface 35 is a device interface that can transfer data to/from flash devices and LV(s).

In embodiments, the array 12 can include an event analyzer 105 that can dynamically monitor the storage array 12 to collect a wide array of data (e.g. storage system telemetry data), both real-time/current and historical. In embodiments, the analyzer 105 can collect data from the storage array 12 and its components 110 via one or more daemons. A daemon can couple to one or more array components 110 and log each component's activity. The components 110 can be any of the elements 16a-n, 21-23, 25a-b, 26, 30, 35, and 40, amongst other known storage system components. The collected data can be real-time and/or historical storage system telemetry data. In embodiments, the data can include information related to a notifications feed to which one or more hosts (e.g., hosts 14a-n) is subscribed to receive.

In embodiments, the analyzer 105 can perform one or more storage array health monitoring techniques. The techniques can include identifying an event from the collected data related to an activity of the array 12. In examples, the analyzer 105 analyzes metadata of the collected data to identify a type of each event from the collected data. The analyzer 105 can further determine if the event is one having a qualifying event type. The qualifying event type can include one or more of: an event having a type to which a host has subscribed to receive notifications and an event that impacts a status and/or a health of the array 12. In response to identifying a qualifying event type, the analyzer 105 can perform an event clearing technique as described in greater detail herein.

Figure 2:
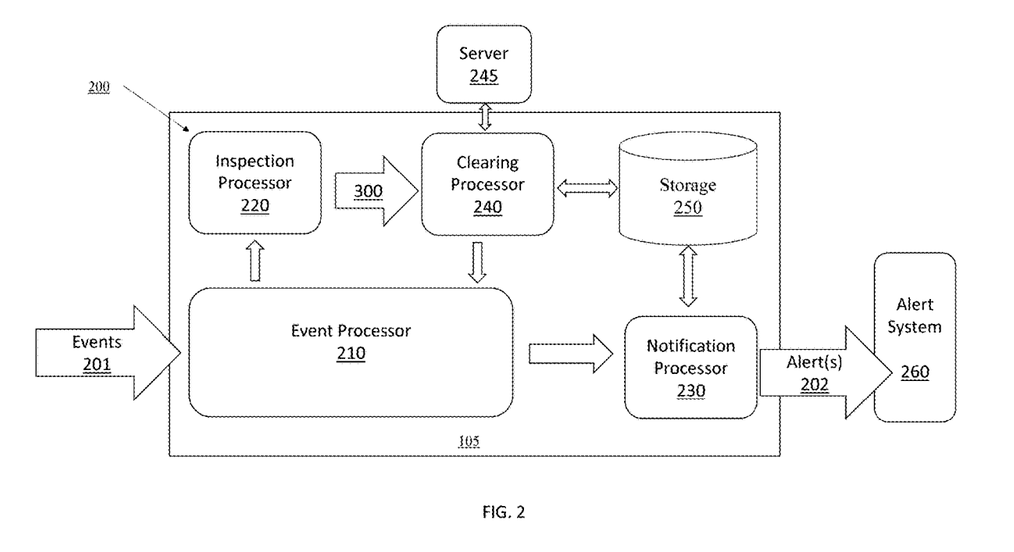
FIG. 2 is a block diagram of an event analyzer in accordance with example embodiments disclosed herein.

Referring to FIG. 2, an event analyzer 105 can include one or more hardware and/or software elements 200 (e.g., event processor 210, inspection processor 220, notifications processor 230, clearing processor 240, and storage 250) configured to perform a variety of storage array health related operations.

The analyzer 105 can be communicatively coupled to the array 12 and its components 110 via a communicative primitive such as Fibre Channels and NVMe (Non-Volatile Memory Express) communication interfaces. The analyzer 105 can receive storage array telemetry data from the array 12 and its components 110. In embodiments, one or more daemons 210 can be communicatively coupled to the storage array 12 and its components 110. The daemons 210 can monitor and collect telemetry data of the array 12 and its components 110. In examples, the daemons 210 can generate searchable data structures (e.g., activity logs) that store and organize the telemetry data in a searchable format. Accordingly, the analyzer 105 can obtain the telemetry data using any known push or pull (e.g., fetch) data retrieval techniques. In embodiments, the telemetry data can include events 201.

In embodiments, the event processor 210 can receive and process the events 201. For example, the event processor 210 can include logic and/or circuitry configured to analyze the events 201 for further processing. In response to receiving the events 201, the logic and/or circuitry can identify a type of each event 201. In embodiments, each event 210 can include metadata defining one or more event characteristics. The event characteristics can include event type, storage array component 110 (e.g., item) related to the event, item type, time, performance metrics, and telemetry data, amongst other storage array event related metadata. In further embodiments, the event processor 210 can generate and append a unique identifier to each event's metadata. The unique identifier can be generated from values representing one or more of the event characteristics. Accordingly, each of the elements 200 and/or processing threads of the analyzer 105 can use the unique identifier to determine a relationship with any generated information and each of the events 201.

In embodiments, the event processor 210 can include an events thread that defines one or more policies and/or instructions for processing the events 210. Accordingly, the event processor 210 performs a call to the events model in response to parsing and identifying event characteristic metrics and values. In response to the call, the events model returns instructions for processing events based on one or more of the event characteristics. For example, the event thread can match an event to processing instructions based on an event type. Thus, the event thread can include logic and/or circuitry configured to associate one or more event characteristics to one or more policies and/or instructions. Additionally, the event thread can generate health metrics regarding each event's impact to a health metric of one or more of the components 110 and/or the array 12. In response to receiving a health metric, the event thread can update, in real-time, a health status of one or more of the components 110 and/or the array 12.

In embodiments, the event thread can analyze performance metrics and telemetry data to generate a health score of the array 12. For example, the event thread can analyze historical and current performance metrics and telemetry data using a machine learning (ML) engine (not shown). The ML engine can include predictive learning logic configured to process the performance metrics and telemetry data. The predictive learning logic can be configured to identify patterns and correlations between the performance metrics and telemetry data from each event and the array 12, as a whole.

In further embodiments, the ML engine can determine a probability of an event impacting a health status of one or more of the components 110 and/or the array 12. For example, the ML engine can identify one or more of the components 110 that are related to each of the events 210 from information included in each event's metadata. The ML engine can further extract additional telemetry data from the metadata and/or issue a request to one or more daemons monitoring each event related components 110. By analyzing historical and/or current telemetry data, the ML engine can generate an impact metric that defines each component's overall impact on a health status of the array 12, each event type's impact on it's related component's health status and the health status of the array 12 (i.e., how each event type per component Impacts the health status of the array 12), and various combinations of event occurrences impact on the health status of the array 12.

In embodiments, the event processor 210 can receive a policy and/or instruction to process one or more of the events 210 via an auto-clearing thread and/or a notifications thread based on each event's event type. The auto-clearing thread can include the inspection processor 220 and the clearing processor 240; the notifications thread can include the notifications processor 230.

In response to the auto-clearing thread receiving an event, the inspection processor 220 can determine if each event's type is a clearing event type. Clearing event types can correspond to an event that renders a previous alert obsolete (e.g., an online event alerts renders a previous offline alert obsolete). An alert can correspond to an event that has been or is one that should be reported to one or more of the host devices 14a-n.

In embodiments, the inspection processor 220 can analyze each event's metadata, including any information appended by the event processor 210. The inspection processor 210 can further categorize and group events based on the item (e.g., component) associated with the event. To identify such items, the inspection processor 220 can perform a search of a searchable item data structure that associates items with one or more item types. The data structure can be configured to identify if an item type can have events that can become obsolete. the inspection processor 220 can queue each event related to an item having an item type associated with at least one alert that can become obsolete.

Figure 3:
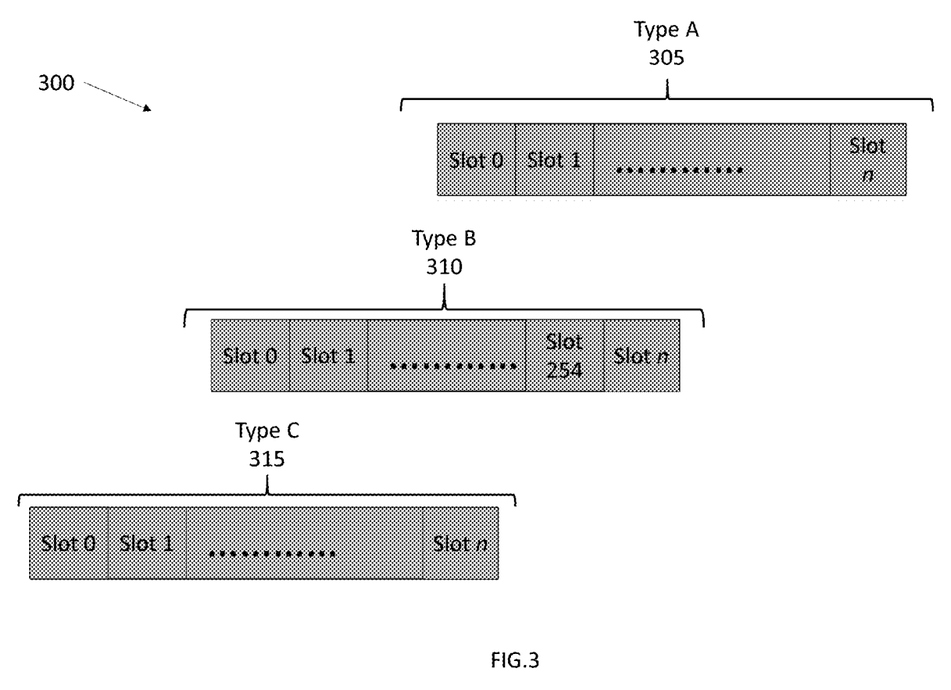
FIG. 3 is a block diagram of a queue for processing

Referring briefly to FIG. 3, the inspection processor 220 can queue such events in an alert engine 300. The alert engine 300 can include queues 305, 310, 315. In embodiments, the inspection processor 220 can group similar events together. For example, the inspection processor 220 can configure each of the queues 305, 310, 315 to store events related to one or more specific item types (e.g., Type A, Type B, and Type C). For example, the inspection processor can configure the queues 305, 310, 315 to store items types based on one or more of, e.g., a level of impact each event's related item type can have on a health score of the array 12, a service level metrics associate with each event, 10 workloads, and array bandwidth, amongst other related parameters. In further embodiments, each of the inspection processor 220 can dynamically provision each queue 305, 310, 315 to buffer events for a buffer period. The buffer period can correspond to one or more of, e.g., a level of impact each event's related item type can have on a health score of the array 12, a service level associate with each event, 10 workloads, and array bandwidth, amongst other related parameters.

Referring back to FIG. 2, the clearing processor 240 can process the events 201 queued by the alert engine 300. In embodiments, the clearing processor 240 can include logic and/or circuitry to process to process the queued events in an order corresponding to the buffer time, queue time, a service level associate with each event, 10 workloads, and/or array bandwidth, amongst other related parameters. Upon receiving an event, the clearing processor 240 can determine a probability that the event's type can make obsolete a previous alert generated from a previously received event.

In embodiments, the clearing processor 240 can identify whether one or more reported alerts and the received event relate to the same item. The clearing processor 240 can further identify if any of the identified reported alerts can be made obsolete by the received event. For example, the clearing processor 240 can search a reported alerts data structure maintained by the notification processor 230 and stored by storage 250. The reported alerts data structure can identify a relationship between reported alerts and items (e.g., the components 110). If the clearing processor 240 makes a positive determination, it can further group the identified reported alerts into sets of related alerts. To increase processing speed and decrease resource utilization, the clearing processor can limit a search of the sets that include more than one or two or more reported alerts.

In further embodiments, the clearing processor 240 pass the event with clearing instructions to the notifications thread. In embodiments, the clearing instructions can include location information of the previous alert made obsolete by the current alert. The location information can be an index location of a searchable data structure (e.g., an alerts log). The clearing processor 240 can retrieve the clearing instructions from a server 245 that warehouses clearing policies, rules, and instructions. The server 245 can include one or more policies, rules and instructions for each event type. Thus, the clearing processor 240 can issue a request including an event's type to the server 245. In response to receiving the request, the server 245 identifies and returns the policies, rules, and instructions related to the event type. In embodiments, the server 245 can be managed by one or more of the host devices 14*a-n*. Accordingly, one or more of the host devices 14*a-n* can generate, update, and store clearing policies, rules, and instructions in the server 245.

In embodiments, the notifications processor 230 can receive events from either or both the event processor 210 and the clearing processor 240. For each event, the notifications processor 230 can determine if any of the events 201 relate to an alert that should be reported to one or more of the host devices 14*a-n* in response to receiving an event from the clearing processor 240 or the event processor 210. In examples, each host device 14*a-n* can subscribe to receive alerts 202 related to one or more events and/or event types, amongst other occurrences a host device deems warranting a subscription to real-time and/or periodic batch alerts 202. Accordingly, the notifications processor 230 can perform a look-up of a searchable subscriptions data structure that associates reportable alerts 202 with one or more of the host devices 14*a-n*.

In other embodiments, the notifications processor 230 can dynamically issue an alert 202 to one or more of the host devices 14*a-n* or an alert system 260. For instance, the notifications processor 230 can analyze information that the event processor 210 and/or the clearing processor 240 have appended to each event. Based on an analysis result, the alerts thread can and issue an alert notification 202 including an alert corresponding to the event. The notification processor 230 can issue the alert notification directly to one or more of the host devices 14*a-n* or indirectly via an alert system 260.

For alerts directly reported alerts, the notifications processor 230 can update an alerts log by clearing obsolete alerts. For example, the notifications processor 230 can identify and process the clearing instructions appended to an event by the clearing processor 230. In further embodiments, the notifications processor 230 can further store a location each alert is stored in an alerts log.

In embodiments, the notifications processor 230 can issue one or more alert notifications 202 to the alert system 260. Each alert notification can include an alert to which an alert subscription exists. The alert notification can include additional information including one or more of metadata identifying an alert type, corresponding source component to include in the reported alerts data structure and clearing instructions. In response to issuing an alert notification to the alert system 250, the notifications processor 260 can update a reported alerts data structure with the reported alerts 202. For each reported alert, the notifications processor 230 can include metadata identifying an alert type and corresponding source component to include in the reported alerts data structure. In further embodiments, the notifications processor 230 can further store a location each alert is stored in an alerts log.

In embodiments, an alert system 260 can maintain an alerts log of the alerts 202 it receives from the notifications processor 230. Further, the alerts can include information identifying one or more of the host devices 14*a-n* to that has subscribed to receive the alert. Accordingly, the alerts system 260 can report a current alert and health status of the array 12 to one or more of the host devices 14*a-n*. Additionally, the alerts system 260 can return an index location of the logged alert to the notifications processor 230. Further, the alert system 260 can identify if an alert includes clearing instructions. In response to identifying a clearing instruction, the alert system 260 can include hardware and/or software elements to execute the clearing instruction. By executing the clearing instruction, the alerts system 260 can the clear obsolete alert. Subsequently, the alert system 260 can analyze the updated alerts log and generate and/or update a health status of the array 12.

In embodiments, the storage 250 can be configured to store data required and/or generated by each of the hardware, software, and/or thread elements 200. Accordingly, the elements 200 can be communicatively coupled to the storage 250 via one or more storage interfaces. The storage interfaces can be configured to receive data read/write requests from each of the elements 200.

Figure 4:
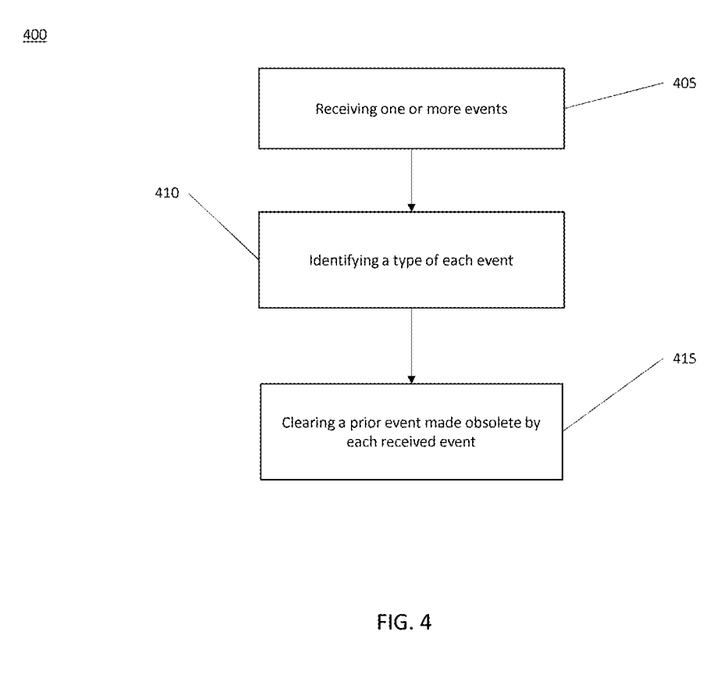
FIG. 4 is a flow diagram of a method for processing events in accordance with example embodiments disclosed herein.
Figure 5:
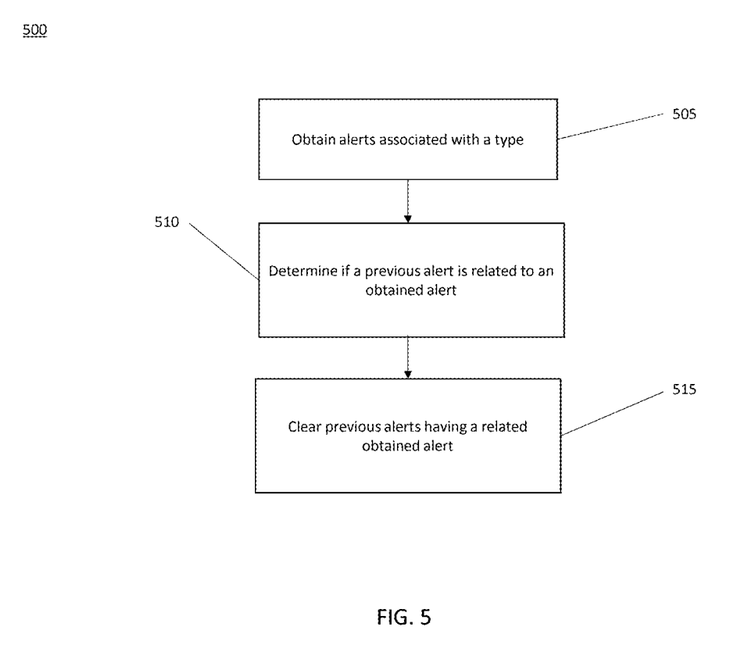
FIG. 5 is a flow diagram of a method for clearing obsolete events in accordance with example embodiments disclosed herein.

FIGS. 4-5 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter.

Referring to FIG. 4, a method 400 can be performed by, e.g., analyzer 105 of FIG. 1. The method 400, at 405, can include receiving one or more events corresponding to a storage array. Each event can include an alert. The method 400, at 410, can also include identifying a type of each of the events. At 415, the method 400 can further include clearing at least one prior event made obsolete by each received event for each event having a qualifying type.

A skilled artisan understands that the method 400 and any of its steps can be performed using any technique described herein.

Regarding FIG. 5, a method 500 can be performed by, e.g., analyzer 105 of FIG. 1. The method 500, at 505, can include obtaining current alerts for each key associated with each event component having an item of interest. For each key, at 510, the method 500 can include determining if a previous alert relates to an obtained current alert. The method 500, at 515, can further include clearing the previous alert if the obtained current alert renders the previous alert obsolete.

A skilled artisan understands that the method 500 and any of its steps can be performed using any technique described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and any combination of the listed parts.

One skilled in the art will realize the concepts described herein can be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising at least one processor configured to:
   receive one or more events corresponding to a storage array, wherein each event includes an alert;
   identify a type of each event, wherein identifying each event type includes:
      parsing metadata from each event,
      generating a unique identifier based on the metadata, and
      appending the unique identifier to its related event;
   for each event having a qualifying type, clearing at least one prior event made obsolete by each received event, wherein the at least one prior event and its corresponding qualifying type event correspond to a matching event type; and
   wherein clearing the at least one prior event includes:
      determining a probability that the type of each event impacts an alert extracted from a previously received event, and
      processing each event through a thread based on each event's characteristics identified by the event's metadata and each event's respective probability.

2. The apparatus of claim 1 further configured to:
   communicatively couple to one or more daemons of the storage array, wherein each daemon is configured to monitor a component of the storage array and transmit one or more logs of events corresponding to the component.

3. The apparatus of claim 2, wherein each daemon generates characteristic metadata corresponding to each event.

4. The apparatus of claim 1 further configured to:
   identify a component related to each event; and
   extract event content from each event.

5. The apparatus of claim 4 further configured to determine if the component corresponds to an item of interest, wherein the item of interest corresponds to a storage device component capable of impacting a health metric of the storage device.

6. The apparatus of clam 5 further configured to determine if the event content relates to a status change of the item of interest.

7. The apparatus of claim 6 further configured to pass those events having a component related to an item of interest and content related to a status change of the item of interest to an auto-clearing inspection queue.

8. The apparatus of claim 7 further configured to generate a key for each item of interest and store the key in the auto-clearing queue.

9. The apparatus of claim 8 further configured to:
   obtain current alerts associated with each key;
   for each key, determine if a previous alert relates to an obtained current alert; and
   clear the previous alert if the obtained current alert renders the previous alert obsolete.

10. A method comprising:
    receiving one or more events corresponding to a storage array, wherein each event includes an alert;
    identifying a type of each event, wherein identifying each event type includes:
       parsing metadata from each event,
       generating a unique identifier based on the metadata, and
       appending the unique identifier to its related event;
    for each event having a qualifying type, clearing at least one prior event made obsolete by each received event, wherein the at least one prior event and its corresponding qualifying type event correspond to a matching event type; and
    wherein clearing the at least one prior event includes:
       determining a probability that the type of each event impacts an alert extracted from a previously received event, and
       processing each event through a thread based on each event's characteristics identified by the event's metadata and each event's respective probability.

11. The method of claim 10 further comprising:
    receiving information from one or more daemons of the storage array, wherein each daemon monitors a component of the storage array and transmit one or more logs of events corresponding to the component.

12. The method of claim 11 further comprising generating characteristic metadata corresponding to each event.

13. The method of claim 10 further comprising:
    identifying a component related to each event; and
    extracting event content from each event.

14. The method of claim 13 further comprising determining if the component corresponds to an item of interest, wherein the item of interest corresponds to a storage device component capable of impacting a health metric of the storage device.

15. The method of clam 16 further comprising determining if the event content relates to a status change of the item of interest.

16. The method of claim 15 further comprising passing those events having a component related to an item of interest and content related to a status change of the item of interest to an auto-clearing inspection queue.

17. The method of claim 16 further comprising generating a key for each item of interest and storing the key in the auto-clearing queue.

18. The method of claim 17 further comprising:
    obtaining current alerts associated with each key;
    for each key, determining if a previous alert relates to an obtained current alert; and
    clearing the previous alert if the obtained current alert renders the previous alert obsolete.

* * * * *